3,461,382
PULSE DEPENDENT FEEDBACK SYSTEM FOR MEASURING CHANGES IN A PHYSICAL PHENOMENON

William W. Anderson, Annapolis, Md., assignor to the United States of America as represented by the Secretary of the Navy
Filed May 28, 1965, Ser. No. 459,961
Int. Cl. G01r 33/02
U.S. Cl. 324—43                                         22 Claims

ABSTRACT OF THE DISCLOSURE

Apparatus for transforming two pulse signals into a feedback signal to form a pulse dependent closed feedback loop. A detected pulse signal and a reference pulse signal are fed through NOR gates and then through a differential integrator, then fed through a feedback coil which is wrapped around a saturable core. The integrator output current and voltage is a function of an applied external DC magnetic field.

---

The invention described herein may be manufactured and used by or for the Government of the United States of America for governmental purposes without the payment of any royalties thereon or therefor.

The present invention relates to feedback systems for use in systems which operate on the principle of generating a signal in response to a physical phenomenon which signal is displaced in time relative to a reference signal. More particularly, this invention relates to a feedback system wherein a time displacement is transformed into a linearly proportional voltage integral through the use of integrated or hybrid analog and digital components for use as a feedback signal which may then be transformed back into the original physical phenomenon.

This invention relates to my copending application Ser. No. 414,926, filed Nov. 30, 1964, for Time Interval Magnetometer, in that the feedback system of this invention was employed at the feedback circuit for the device of said copending application. Consequently, discussion of this invention will be in terms of its use with the time interval magnetometer concept. Briefly, the time interval magnetometer is based on the concept of a single saturating core whose primary winding is driven by a linear with time ramp voltage. With proper coil and core characteristics, the secondary windings will provide a pulse type signal whose displacement along the time axis is linear with the value of the magnetic field along the core axis. Suitable amplifying, wave shaping, and digital circuitry then will provide a sharp pulse at a time interval equal to the above time displacement, and polarity information based upon whether the secondary winding pulse leads or lags some preset zero point in time with reference to the primary winding driving signal. Time interval measurements then can be made to provide high resolution digital readings of magnetic field intensities of a restricted dynamic range. Alternatively, a feedback system of some sort can be employed to provide analog readings of magnetic field intensities of somewhat less resolution over an increase dynamic range.

The prior art includes feedback magnetometers wherein the feedback signal is an amplitude dependent signal. An example of the feedback magnetometer of this type is U.S. Patent 2,752,564, issued June 26, 1956 to C. M. Ryerson, wherein substantially complete neutralization of a measured field is accomplished through generation of an opposing field by a feedback signal derived from a change in the voltage amplitude of the detected field.

The present invention, however, is concerned with time displacement signals and provides means for generating a signal in response to a physical phenomena which signal is displaced in time relative to a reference signal and transforming said signal into a voltage error signal which can then be employed in a feedback loop to provide a pulse dependent feedback system. Therefore, given any system which operates on a principle of changing a physical phenomenon into a time displacement with respect to some reference; this invention provides means for transforming this time displacement as measured by pulse displacement or pulse width into a linearly proportional signal which when used in conjunction with a means of transforming this signal back into the original phenomenon (e.g., transforming current into magnetic fields by means of passing the current through a solenoid coil or transforming voltage into electric fields by similar means) can be usefully employed in a nulling or feedback system with pulse utilization, with the above mentioned signal being related to the physical phenomenon.

An object of the present invention is to provide new and improved apparatus for detecting and measuring a physical phenomenon, e.g. a magnetic field, through the use of a closed loop pulse dependent feedback system.

A further object is to provide a circuit capable of transforming the time displacement with respect to a time reference into an error signal which can be employed in a feedback loop.

A still further object is to provide an output voltage which is a suitable analog of the physical phenomenon being measured.

Other objects in many of the intended advantages of this invention will be readily appreciated as the same becomes better understood by reference to the following detailed description when considered in connection with the accompanying drawings wherein.

Figure 1:
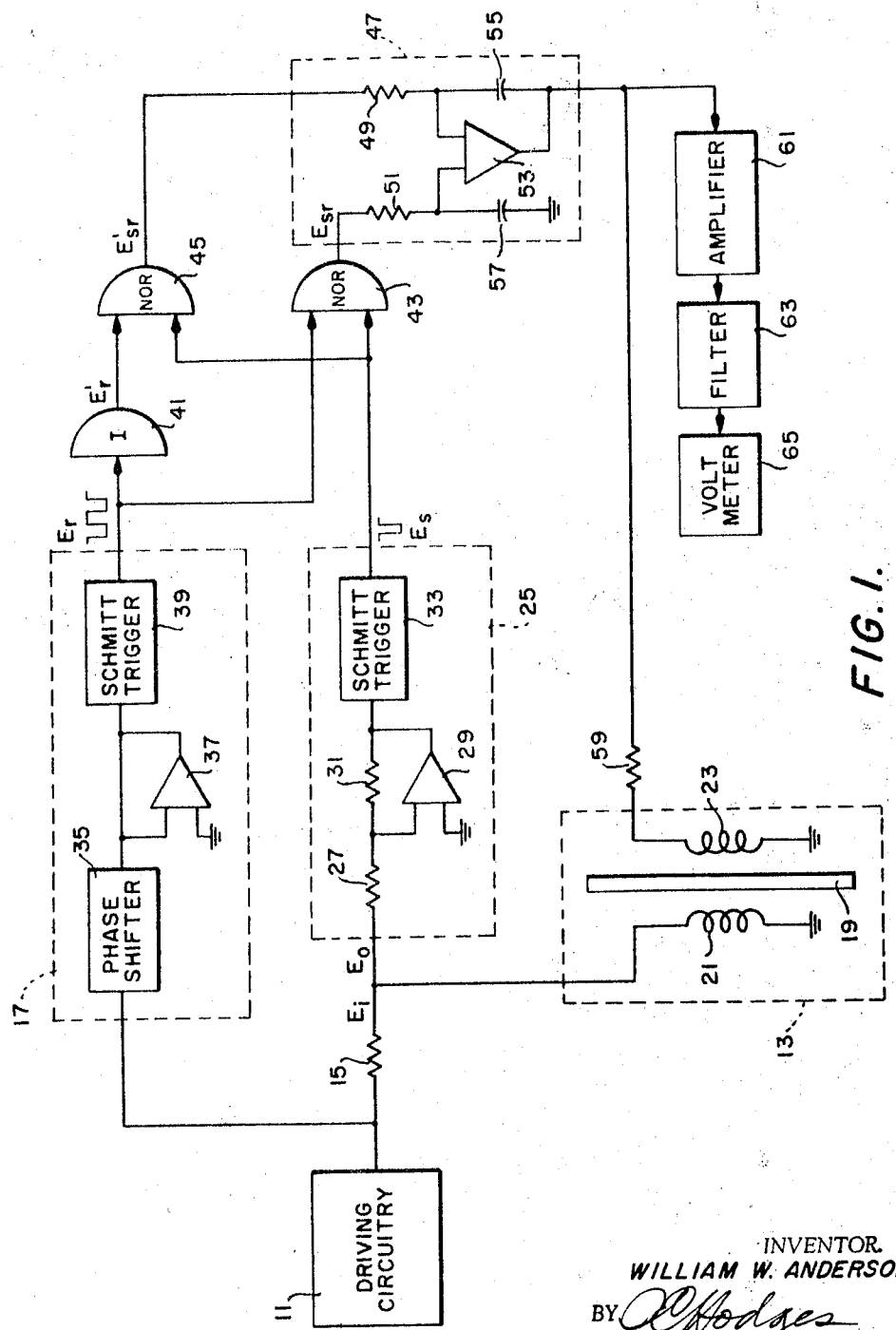
FIG. 1 is a circuit diagram of a preferred embodiment of this invention.

Referring now to the drawings there is shown in FIG. 1, driving circuitry 11 connected to a sensing probe 13 through a resistor 15, and to reference wave shaping circuitry 17. The sensing probe 13 comprises a saturable core sample 19 of any suitable magnetic material such as Superpermalloy surrounded by a driving and detecting coil 21 and a feedback coil 23. The driving and detecting coil 21 is connected to a signal wave shaping circuitry 25 which comprises a resistor 27 connected to an operational amplifier 29 having a resistor 31 in the feedback loop, the amplifier 29 being connected to a Schmitt trigger 33.

The reference wave shaping circuitry 17 comprises an RC phase shifter 35 connected to an operational amplifier 37 which in turn is connected to a Schmitt trigger 39. A suitable operational amplifier which may be used throughout this circuit is the K2-W unit manufactured by G. A. Philbrick Researchers, Inc. The Schmitt trigger 39 is connected to an inverter 41 which may be a NOR gate and to another NOR gate 43. The inverter 41 is connected to NOR gate 45 and Schmitt trigger 33 is connected to both NOR gate 43 and 45. The operation of NOR gates 43 and 45 is such that an output of −10 volts will be produced only when both of the inputs of the particular NOR gate is 0 volts. If either or both of the inputs of the particular NOR gate is at −10 volts, then the output of the NOR gate will be 0 volts.

The NOR gates 43 and 45 are connected to a differential integrator 47. The differential integrator comprises a resistor 49 at one input nad a resistor 51 at the other input, the resistors being connected to an operational amplifier 53 having a capacitor 55 in the feedback loop. The input to the differential integrator including the resistor 51 is connected to ground through a capacitor 57. The differential integrator 47 is connected to the feedback coil 23 through a resistor 59 and may also be connected to a stabilized amplifier 61, a filter 63, and a volt meter 65.

The operation of the system so far described is as follows:

The driving circuitry 11 provides a fluctuating wave form output, $E_i$, e.g., a sine wave, to the sensing probe 13 through the resistor 15 and to the reference wave shaping circuitry 17. The sensing probe 13 uses only one winding 21 in the place of both the usual primary and secondary windings for the purpose of driving and detection, with the current being the driving signal and the voltage being the detected signal. This is possible by virtue of the fact that the resistor 15 is chosen to be of relatively high resistance thereby causing the driving circuitry to approximate a constant current source so that the current actually going through the coil 21 is the analog of the driving voltage. The current drives the probe into saturation; however, during a small part of the driving cycle, the core passes through a region of non-saturation and high permeability. During this period of non-saturation, the changes in permeability produce a voltage pulse output signal, $E_o$. This output signal, $E_o$, is a voltage pulse across coil 21 which corresponds to the period of time the coil material is in a non-saturated state and whose position in time is a function of the driving signal and the ambient magnetic field. The driving and detecting coil voltage, $E_o$, is then sent to the signal wave shaping circuitry 25, that is, through resistor 27, to amplifier 29 and to the Schmitt trigger 33 for wave shaping. The Schmitt trigger 33 is biased in such a way so that only the negative of the two pulses present is shaped and provides an output pulse, $E_s$.

The voltage signal, $E_i$, which is fed to reference wave shaping circuitry 17, is passed through a time delay means shown as phase shifter 35, amplifier 37 and is shaped by the Schmitt trigger 39 providing an output pulse, $E_r$. Depending upon the driving waveform, the time delay may take forms other than the phase shifter of the present case as would be obvious to those having ordinary skill in the art. At this point there exists two pulses, one at the output of each trigger 33 and 39. The first of these pulses $E_r$, is a time reference signal which is shifted in time by phase shifter 35 by a constant amount in time from the zero crossing point of the input voltage, $E_i$, to compensate for the shifts in the magnetometer. The second of these pulses, $E_s$, is a detected pulse representing an amplified and wave shaped transformation of the detecting and driving coil voltage, $E_o$. These pulses are provided because the time interval magnetometer concept disclosed in my co-pending application dictates that the pulse voltage, $E_s$, will shift in time with respect to $E_r$ in a manner which is proportional to the magnetic field along the axis of the core sample 19. Due to a sine wave being employed as the driving wave form, the time shift is not linearly proportional to the magnetic field; however, use of a feedback loop obviates the need for direct proportionality.

Figure 2:
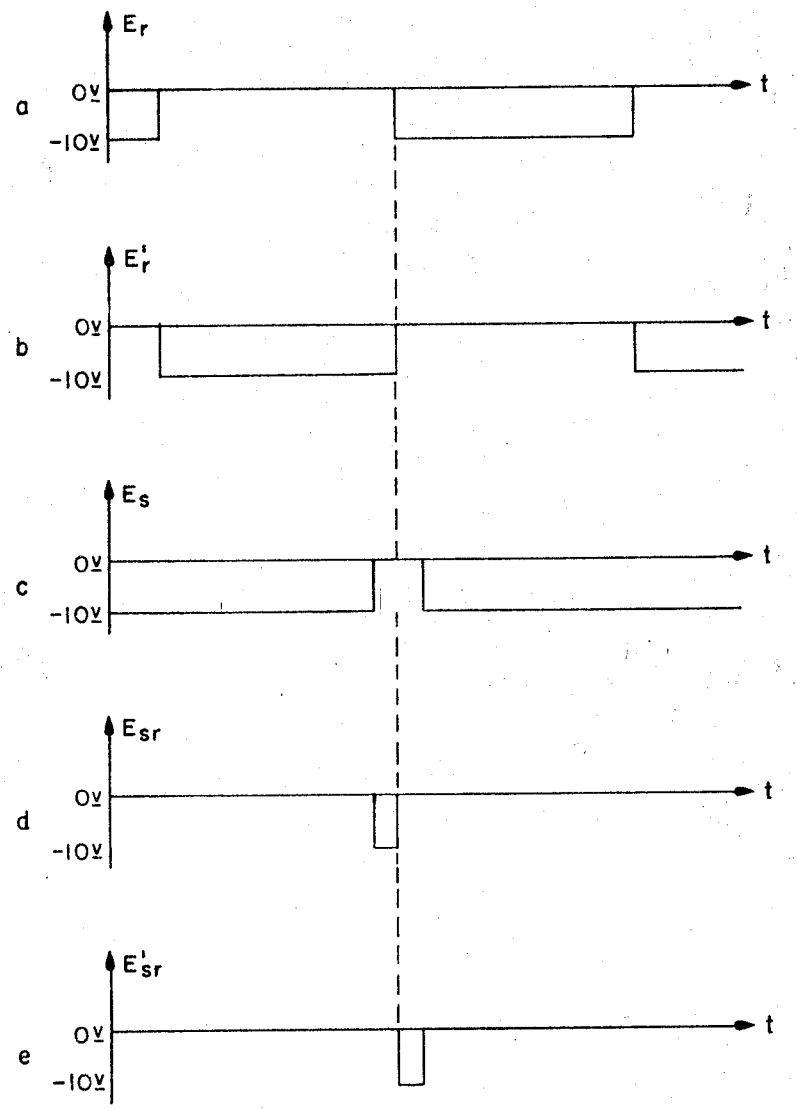
FIG. 2 is explanatory wave forms which serve to illustrate the operation of the system.

This invention is primarily concerned with the means whereby the two pulse signals, $E_r$ and $E_s$, are transformed into a proper feedback signal so as to form a pulse dependent closed feedback loop. This transformation is achieved through the use of three NOR gates 41, 43, and 45, and the differential integrator 47. The time reference signal, $E_r$, is inverted through NOR gate 41 to form $E'_r$ which is then passed to NOR gate 45 with $E_r$ being fed to NOR gate 43. The time displacement signal $E_s$ is fed to both NOR gate 43 and NOR gate 45. As stated previously the operation of NOR gates 43 and 45 is such that an output of $-10$ volts will be produced only when both of the inputs of the particular NOR gate is 0 volts. If either of the inputs of the particular NOR gate is at $-10$ volts, or both inputs, then the output of the NOR gate will be 0 volts. It is to be noted that although negative going NOR logic has been assumed, this circuit is not limited thereto, and other logic configurations may be employed. The wave forms resulting from negative going NOR type of logic are shown in FIG. 2.

Assume as shown in FIGS. 2a and 2c, that the time displacement signal, $E_s$, is positioned in time with respect to the reference signal, $E_r$, so that precisely one half of the width of $E_s$ lies to the left in time of the reference point dictated by $E_r$, i.e., the dashed line, and the other half of the displacement signal lies to the right of this point. The logic of the circuitry then dictates that the output of NOR gates 43 and 45, $E'_{sr}$ and $E_{sr}$, as shown in FIGS. 2e and 2d respectfully, will essentially be the two halves as mentioned of the original detected time displacement signal $E_s$. These two signals are then fed through the differential integrator 47 which performs the function:

$$\int (E_{sr} - E'_{sr}) dt$$

The output of the integrator 47 is then fed back as a current through the feedback coil 23 around the core sample 19 via resistor 59, which controls the stability, response, and sensitivity of the unit. In the above assumed case, if the two inputs of the differential integrator $E'_{sr}$ and $E_{sr}$ are precisely of the same width and amplitude, the net change in the DC output of the integrator 47 will be zero. If there is now a change in the external DC magnetic field, the pulse $E_s$ shifts in time with respect to the reference signal $E_r$. This causes $E'_{sr}$ to grow wider and $E_{sr}$ to grow smaller or vice versa depending upon the direction of the time shift and hence the polarity of the applied magnetic field change. This in turn unbalances the two inputs into the differential integrator 47 to change its output voltage so as to bring $E_s$ back to the same point in time with respect to $E_r$ by changing the field produced by the feedback coil 23. The integrator output current and also the voltage is a function of the applied external DC magnetic field because the integrator load in this case is purely resistive and the field produced by the feedback coil is linearly related to the feedback current producing it. Therefore, the net result is that the combination of the pulse splitting logic as shown by the NOR gates 41, 43 and 45, and the differential integrator 47 maintains the position of $E_s$ with respect to $E_r$ by continuously changing the output of the integrator voltage and hence the magnetic field produced by the feedback coil 23, so as to balance out the external DC magnetic field. The output of the integrator 47 may then be further amplified by amplifier 61, filtered by the filter 63, and fed through a volt meter 65 whose reading then is directly proportional to the DC magnetic field along the axis of the core sample 19.

Figure 3:
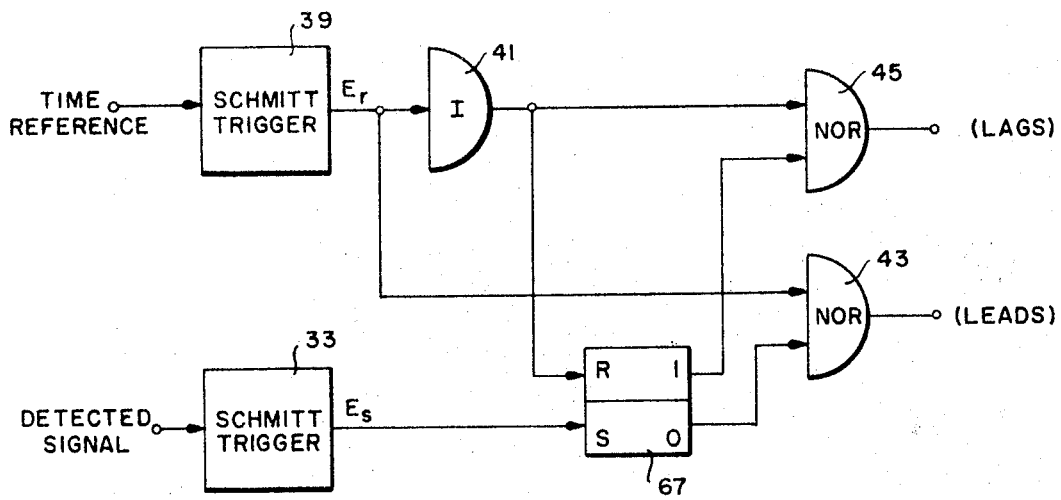
FIG. 3 is a modification in block diagram form of the logic circuitry of this invention.

Referring now to FIG. 3, there is shown a modification in the logic circuitry of FIG. 1. A bistable multivibrator 67 is added to the combination of the two Schmitt triggers 33 and 39, and the three NOR gates 41, 43 and 45 of FIG. 1. Again the wave forms would be as shown in FIG. 2 and negative going logic is assumed. Thus the NOR gate would produce a minus output only in the case where both inputs were zero, and where either or both inputs were minus, the NOR gate would give a zero output. The bistable multivibrator 67 triggers at the set and reset inputs (shown as S and R in FIG. 3) only on negative slopes, producing a $-10$ volts at the one output when set and 0 volts at the one output when reset, and the inversion of this at the zero output. Thus, NOR gate 45 produces a $-10$ volt pulse output only when the negative edge of $E_s$ lags the negative edged $E_r$ and the duration of the pulse is the amount of the lag. NOR gate 45 produces no pulse output when $E_s$ leads $E_r$. Correspondingly, NOR gate 43 produces a $-10$ volt pulse only when $E_s$ leads $E_r$ and no pulse otherwise. Thus, when this type of circuit is employed in a feedback system, the result is that the differential integrator 47 maintains the state that the negative edge of $E_s$ neither leads or lags in time the negative edge of $E_r$, but remains precisely coincident with it. This configuration provides that at the null point, the differential integrator receives zero signals rather than two pulses of equal duration and amplitudes as did the circuit shown in FIG. 1. The above circuit depends highly on high resolution logic with fast rise time for successful operation. However, if such is not the case, a "dead zone" will result around the null point, which may be remedied by the addition of a monostable multivibrator and a fourth NOR gate as would be obvious to those of ordinary skill in the art.

Figure 4:
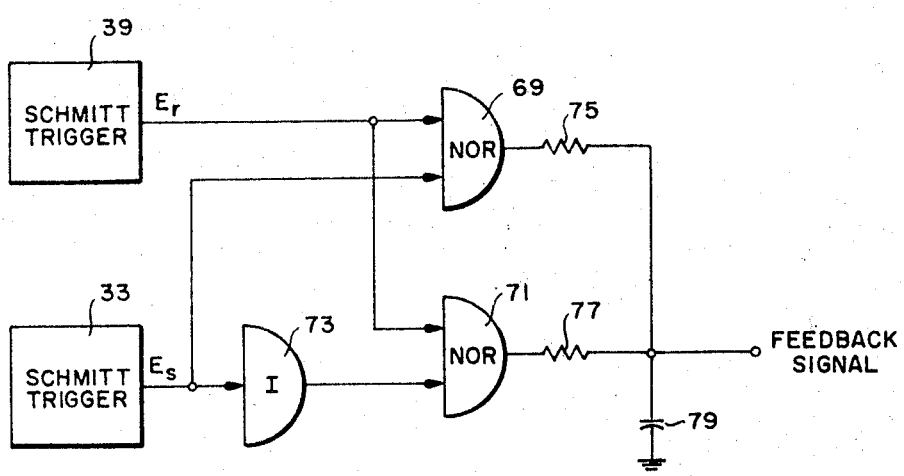
FIG. 4 is a further modification in block diagram form of the logic circuitry of this invention.

A further modification of the logic circuitry of FIG. 1 is shown in FIG. 4, wherein an ordinary summing integrator is employed in place of the differential integrator of FIG. 1. This circuit uses the mixture of negative going and positive going digital logic with NOR gate 69 being negative going and NOR gate 71 being positive going. The output of NOR gate 69 is the same as the output of NOR gate 43 in FIG. 1. The negative going NOR gate 73 is used as an inverter in the same manner as NOR gate 41 in FIG. 1, except that it is necessary here to invert the time displacement signal, $E_s$, rather than the reference signal, $E_r$, because of the characteristics of the positive going NOR gate 71. NOR gate 71 operates to provide an output of 0 volt only when both inputs are zero and an output of +10 volts when either input or both inputs are minus. The net result is that the output of NOR gate 71 is identical to the output of NOR gate 45 in FIG. 1, except that the pulse goes to +10 volts from zero volt rather than −10 volts. Thus, the need for a differential type of analog integrator is eliminated and an ordinary summing integrator can be employed. The summing integrator comprises resistors 75 and 77 and capacitor 79, with the output voltage across the capacitor 79 representing the feedback signal of the system.

Obviously many modifications of variations of the present invention are possible in the light of the above teachings, i.e., the concept of combining digital components with an analog integrator or passive integrator to provide a feedback signal. It is therefore to be understood, that within the scope of the appended claims, the invention may be practiced otherwise in as specifically described.

What is claimed is:

1. A pulse dependent feedback system for measuring changes in a physical phenomena, said system comprising:
   means for providing a time reference pulse signal corresponding to a predetermined condition of said physical phenomenon;
   means for providing a detected pulse signal corresponding to changeable conditions of said phenomena;
   logic means for combining said reference and detected pulse signals to provide first and second pulse signals each having a duration proportional to changes in said phenomenon from said predetermined condition;
   means for integrating said first and second pulse signals to provide an analog signal output representative of said changes in both sense and amplitude; and
   means for converting and applying said output as a feedback to said phenomenon in a sense tending to restore said phenomenon to said predetermined condition,
   whereby said output provides a measure of said changes.

2. A pulse dependent feedback system according to claim 1 wherein said means for providing a time reference pulse signal comprises:
   means for providing a fluctuating waveform signal;
   time delay means responsive to said fluctuating waveform for time shifting said waveform to approximate a predetermined condition of said physical phenomenon; and
   means for shaping said shifted waveform to provide a reference pulse signal.

3. A pulse dependent feedback system according to claim 2 further comprising amplifying means responsive to said shifted waveform for providing amplified shifted waveform to said shaping means.

4. A system according to claim 2 wherein said means for shaping is a Schmitt trigger.

5. A pulse dependent feedback system according to claim 1 for measuring changes in a physical phenomena wherein said physical phenomenon is a magnetic field and said means for providing a detected pulse signal comprises:
   means for providing a fluctuating waveform signal;
   means responsive to said fluctuating waveform for driving a saturable core into and out of the condition of saturation;
   means for detecting the changeable condition of said saturable core and thereby providing a detected signal corresponding to said changeable physical phenonmena; and
   means for shaping said detected signal to provide a detected pulse signal.

6. A pulse dependent feedback system according to claim 5 further comprising amplifying means responsive to said detected signal for providing an amplified detected signal to said shaping means.

7. A pulse dependent feedback system according to claim 5 wherein said means for driving and means for detecting is a single winding surrounding said saturable core.

8. A pulse dependent feedback system acording to claim 5 wherein said means for shaping is a Schmitt trigger.

9. A pulse dependent feedback system according to claim 1 wherein said logic means for combining said reference and detected pulse signals comprises:
   first logic means in a first circuit responsive to said reference pulse and to said detected pulse for providing a first pulse of a duration corresponding to time lead of said detected pulse with respect to said reference pulse at a predetermined level; and
   second logic means in a second circuit responsive to said reference pulse and to said detected pulse for providing a second pulse of a duration corresponding to time lag of said detected pulse with respect to said reference pulse at a predetermined level,
   whereby the relative widths of said first and second pulses are proportional to the changes in said phenomenon from said predetermined condition.

10. A pulse dependent feedback system according to claim 9 wherein each of said first and second logic means is a NOR gate and wherein said logic means for combining said reference and detected pulse signals further comprises:
    third logic means in one of said circuits for inverting said pulse signal in said circuit and providing an inverted pulse signal to said logic means in said circuit.

11. A pulse dependent feedback system according to claim 9 wherein said means for integrating said first and second pulses is a differential integrator providing an output signal representative of said changes in said physical phenomenon.

12. A pulse dependent feedback system according to claim 1 wherein said logic means for combining said reference and detected pulse signals comprises:
    bistable means having a first and second state and having first and second output terminals, said bistable means being responsive to said reference pulse signals for initiating said first state and to said detected pulse signal for initiating said second state for providing at each output terminal pulse signals of a first and a second level, whereby when said bistable means is in said first state, said first output terminal provides a pulse signal of the first level and said second output terminal provides a pulse signal of the second level and when said bistable means is in said second state, said first output terminal provides a pulse signal of the second level and said second output terminal provides a pulse signal of the first level;

first logic means in a first circuit responsive to said reference pulse signal and to said pulse signals from said first bistable means output terminal for providing a first pulse corresponding to time coincidence of said pulses at a predetermined level; and second logic means in a second circuit responsive to said reference pulse signal and to said pulse signals from said second bistable means output terminal for providing a second pulse corresponding to time coincidence of said pulses at a predetermined level;

whereby said first logic means provides a pulse when said detected pulse lags said reference pulse and said second logic means provides a pulse when said detected pulse leads said reference pulse, the relative widths of said pulse being proportional to changes in said phenomenon from said predetermined condition.

13. A pulse dependent feedback system according to claim 12 wherein each of said first and second logic means is a NOR gate and wherein said logic means for combining said reference and detected pulse further comprises:
third logic means in one of said circuits for inverting said pulse signal in said circuit and providing an inverted reference pulse signal to said logic means in said circuit and to said bistable means.

14. A pulse dependent feedback system according to claim 12 wherein said means for integrating said first and second pulses is a differential integrator providing an output indicative of said changes in said physical phenomenon, said differential integrator performing the function $\int(E_{rs}-E'_{sr})dt$, wherein:
$E'_{sr}$ is the first pulse output from said first logic means; and
$E_{sr}$ is the second pulse output from said second logic means.

15. A system according to claim 1 wherein said logic means for combining said reference and detected pulse signals comprises:
first logic means in a first circuit responsive to said detected pulse and to said reference pulse providing a first pulse of one polarity corresponding to time coincidence of said pulses at a predetermined level; and
second logic means in a second circuit responsive to said detected pulse and to said reference pulse providing a second pulse of an opposite polarity corresponding to time coincidence of said pulses at a predetermined level;
whereby the widths of said first and second pulses is proportional to changes in said phenomenon from said predetermined condition.

16. A pulse dependent feedback system according to claim 15 wherein each of said first and second logic means is a NOR gate and wherein said logic means for combining said reference and detected pulse signals further comprises:
third logic means in one of said circuits for inverting said pulse signal in said path and providing an inverted pulse signal to said logic means in said circuit.

17. A system according to claim 15 wherein said means for integrating said first and second pulses is a summing integrator comprising:
a capacitor having one plate grounded;
a first resistor connected between the output of said second logic means and the other plate of said capacitor;
a second resistor connected between the output of said third logic means and the other plate of said capacitor;
whereby the voltage across the capacitor is representative of the changes in said phenomenon from said predetermined condition.

18. A system according to claim 1 wherein said means for converting and applying said output as a feedback to said phenomenon comprises a feedback coil surrounding a saturable core,
whereby said feedback coil nulls out said phenomena.

19. A system according to claim 1 wherein said output from said integrating means is also fed to an indicating means providing a measure of the changes in said physical phenomenon.

20. A pulse dependent feedback system for measuring changes in a physical phenomenon, said system comprising:
means for providing a fluctuating waveform signal;
time delay means responsive to said fluctuating waveform for time shifting said waveform to approximate a predetermined condition of said physical phenomenon;
means for amplifying said shifted waveform signal;
first Schmitt trigger means for shaping said amplified waveform to provide a reference pulse signal;
a single coil surrounding a core sample responsive to said fluctuating waveform signal for driving said core sample into saturation and for detecting changeable conditions in said core as affected by said physical phenomenon and for providing a detected signal corresponding to said changeable conditions;
means responsive to said detected signal for amplifying said detected signal;
second Schmitt trigger means for shaping said amplified detected signal to provide a detected pulse signal;
logic means for inverting said reference pulse signal and providing an inverted reference pulse signal;
a first NOR gate responsive to said inverted reference pulse and to said detected pulse for providing a first pulse corresponding to time coincidence of said inverted pulse and said detected pulse at a predetermined level;
a second NOR gate responsive to said reference pulse and to said detected pulse for providing a second pulse corresponding to time coincidence of said reference pulse and said detected pulse at a predetermined level;
whereby the relative widths of said first and second pulses are proportional to changes in said phenomenon from said predetermined condition;
differential integrator means for integrating said first and second pulses to provide an output signal representative of said changes in said physical phenomenon, said differential integrator means performing the function $\int(E_{sr}-E'_{sr})dt$, wherein:
$E'_{sr}$ is the first pulse output from said first NOR gate; and
$E_{sr}$ is the second pulse output from said second NOR gate;
a feedback coil surrounding said core sample for converting and applying said output signal as a feedback to said phenomenon in a sense tending to restore said phenomenon to said predetermined condition; and
indicating means responsive to said output signal providing a measure of the changes in said physical phenomenon.

21. A pulse dependent feedback system for measuring changes in a physical phenomenon, said system comprising:
means for providing a fluctuating waveform signal;
phase shifting means responsive to said fluctuating waveform for time shifting said waveform to approximate a predetermined condition of said physical phenomenon;

means for amplifying said shifted waveform signal;

first Schmitt trigger means for shaping said amplified waveform to provide a reference pulse signal;

a single coil surrounding a core sample responsive to said fluctuating waveform signal for driving said core sample into saturation and for detecting changeable conditions in said core as affected by said physicall phenomenon and for providing a detected signal corresponding to said changeable conditions;

means responsive to said detected signal for amplifying said detected signal;

second Schmitt trigger means for shaping said amplified detected signal to provide a detected pulse signal;

logic means for inverting said reference pulse signal and for providing an inverted reference pulse signal;

bistable means having a first and second state and having first and second output terminals, said bistable means being responsive to said inverted reference pulse signals for initiating said first state and to said detected pulse signal for initiating said second state for providing at each output terminal pulse signals of a first and a second level, whereby when said bistable means is in said first state, said first output terminal provides a pulse signal of the first level and said second output terminal provides a pulse signal of the second level and when said bistable means is in said second state, said first output terminal provides a pulse signal of the second level and said second output terminal provides a pulse signal of the first level;

first NOR gate means responsive to said inverted reference pulse signal and to said pulse signals from said first bistable means output terminal for providing a first pulse corresponding to time coincidence of said pulse at a predetermined level;

second NOR gate means responsive to said detected pulse signal and to said pulse signals from said second bistable means output terminal for providing a second pulse corresponding to time coincidence of said pulses at a predetermined level;

whereby said first NOR gate means provides a pulse when said detected pulse lags said reference pulse and said second NOR gate means provides a pulse when said detected pulse leads said reference pulse, the relative widths of said pulses being proportional to changes in said phenomenon from said predetermined condition;

differential integrator means for integrating said first and second pulses to provide an output signal representative of said changes in said physical phenomenon, said differential integrator means performing the function $\int(E_{sr}-E'_{sr})dt$, wherein:

$E'_{sr}$ is the first pulse output from said first NOR gate means; and $E_{sr}$ is the second pulse output from said second NOR gate;

a feedback coil surrounding said core sample for converting and applying said output signal as a feedback to said phenomenon in a sense tending to restore said phenomenon to said predetermined condition; and indicating means responsive to said output signal providing a measure of the changes in said physical phenomenon.

22. A pulse dependent feedback system for measuring changes in a physical phenomenon, said system comprising:

means for providing a fluctuating waveform signal;

phase shifting means responsive to said fluctuating waveform for time shifting said waveform to approximate a predetermined condition of said physical phenomenon;

means for amplifying said shifted waveform signal;

first Schmitt trigger means for shaping said amplified waveform to provide a reference pulse signal;

a single coil surrounding a core sample responsive to said fluctuating waveform signal for driving said core sample into saturation and for detecting changeable conditions in said core as affected as physical phenomenon and for providing a detected signal corresponding to said changeable conditions;

means responsive to said detected signal for amplifying said detected signal;

second Schmitt trigger means for shaping said amplified detected signal to provide a detected pulse signal;

logic means for inverting said detected pulse signal and providing an inverted detected pulse signal;

first NOR gate means responsive to said detected pulse and to said reference pulse providing a first pulse of one polarity corresponding to time coincidence of said pulses at a predetermined level;

second NOR gate means responsive to said inverted detected pulse and to said reference pulse providing a second pulse of an opposite polarity corresponding to time coincidence of said pulses at a predetermined level;

whereby the widths of said first and second pulses is proportional to changes in said phenomenon from said predetermined condition;

a capacitor having one plate grounded;

a first resistor connected between the output of said second logic means and the other plate of said capacitor;

a second resistor connected between the output of said third logic means and the other plate of said capacitor;

wereby the voltage across the capacitor is an output signal representative of the changes in said phenomenon from said predetermined condition;

a feedback coil surrounding said core sample for converting and applying said output signal as a feedback to said phenomenon in a sense tending to restore said phenomenon to said predetermined condition; and indicating means responsive to said output signal providing a measure of the changes in said physical phenomenon.

References Cited
UNITED STATES PATENTS

| | | | |
|---|---|---|---|
| 2,837,644 | 6/1958 | Shallon | 328—109 |
| 3,179,786 | 4/1965 | Greene | 219—125 |
| 3,281,670 | 10/1966 | Myers et al. | 324—47 |
| 3,346,807 | 10/1967 | Wood et al. | 324—37 |

RUDOLPH V. ROLINEC, Primary Examiner

R. J. CORCORAN, Assistant Examiner

U.S. Cl. X.R.

324—83; 340—187